J. G. RANDALL.
Ore Amalgamator.
No. 40,501.
Patented Nov. 3, 1863.
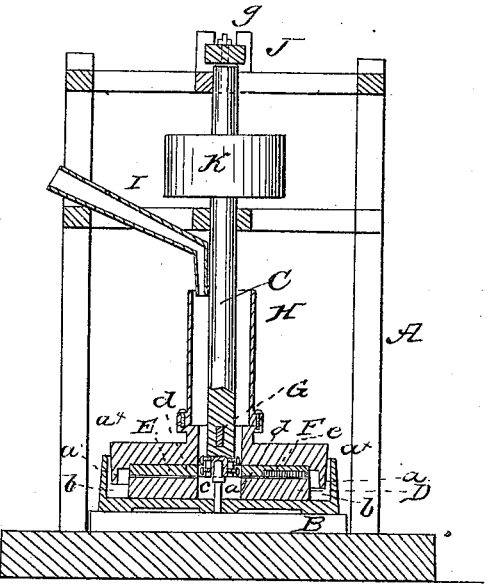
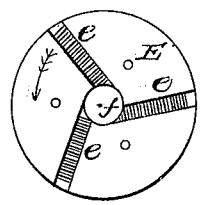
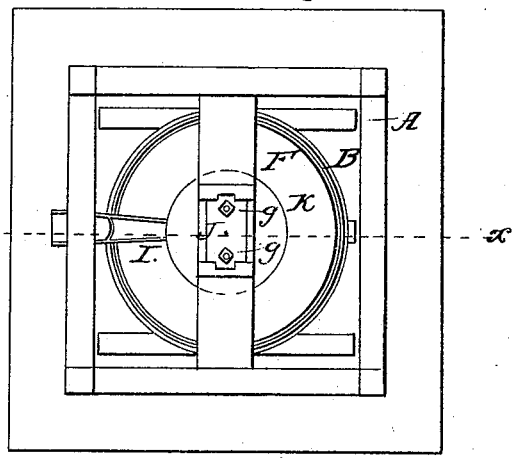

UNITED STATES PATENT OFFICE.

JOHN G. RANDALL, OF CAÑON CITY, COLORADO.

IMPROVED MACHINE FOR GRINDING ORES AND AMALGAMATING PRECIOUS METALS.

Specification forming part of Letters Patent No. 40,501, dated November 3, 1863.

*To all whom it may concern:*

Be it known that I, JOHN G. RANDALL, of Cañon City, in the county of Fremont and Territory of Colorado, have invented a new and improved device for pulverizing ores and amalgamating the metals contained therein; and I do hereby declare that the following is a full, clear, and exact description of the same, reference being had to the accompanying drawings, making a part of this specification, in which—

Figure 1 is a vertical central section of my invention, taken in the line $x\,x$, Fig. 3; Fig. 2, a detached face view of the revolving muller-plate; Fig. 3, a plan or top view of Fig. 1.

Similar letters of reference indicate corresponding parts in the several figures.

The object of this invention is to obtain a device by which gold and silver ore, and particularly quartz, pulp, or tailings from a stamp-mill, may be pulverized and the metal it contains thoroughly amalgamated.

To enable those skilled in the art to fully understand and construct my invention, I will proceed to describe it.

A represents a rectangular frame, which supports the working parts of the machine; and B is a pan, at the center of which there is a vertical pin, $a$, on which a verticals haft, C, is fitted and allowed to rotate freely. On the bottom of the pan B there is fitted a circular die, D, which may be of iron or other suitable material. This die does not reach the side of the pan B, a space, $b$, being allowed all around it, as shown clearly in Fig. 1. The die D has a circular opening, $c$, at its center, forming an eye, and the upper edge of said opening, $c$, is notched, as shown at $d$. The face or upper side of the die D is perfectly smooth, with the exception of the notches above referred to.

E is a circular die, which is attached to the under side of a circular pan, F, the rim $a'$ of which extends down into the space $b$ between the die D and the rim of the pan B. The face side of the die E is provided with three furrows or grooves, $e\,e\,e$, which are tangential with a circular opening, $f$, at the center of the die. (See Fig. 2.) The furrows or grooves $e$ are corrugated transversely.

The pan F is connected with the shaft C by means of a driver, G, which passes transversely through the shaft, and has its ends fitting in recesses or notches in the circular opening at the center of the pan. To the top of the pan F there is attached a vertical tube, H, said tube encompassing the shaft and extending up a considerable distance.

I is a trough or spout, which leads into the upper end of the tube H.

On the upper end of the shaft C a block, J, rests or bears, and has screw-bolts $g$ passing through it, by adjusting which the upper die, E, may be made to press upon the lower one, D, in a greater or less degree, as may be required.

K is a driving-pulley placed on the shaft C.

The operation is as follows: The shaft C is rotated by any convenient power, and the pulp is conducted into the tube H through the trough or spout I, and passes down and into the furrows $e\,e\,e$, but it cannot pass out at the ends of said furrows, owing to the position of the same, which gives them a tendency to throw the pulp to the center of the die as the latter rotates. The pulp is forced by static pressure between the faces of the two dies D E from the sides of the furrows $e$, and it is pulverized between said dies and the metal particles burnished, the pulp passing out and being forced through quicksilver placed in the space $b$, and the metal particles combining or amalgamating therewith. The refuse passes out at $a^\times$.

The whole device is simple and efficient, and may be constructed at a small cost.

The dies D E, when worn, may be removed and replaced by new ones, as it is designed to have them made detached and fitted to the pans in such a manner that they may be readily removed.

Having thus described my invention, what I claim as new, and desire to secure by Letters Patent, is—

The stationary die D, secured within a stationary pan, B, in combination with the revolving die E, provided with furrows $e$, and secured within the pan F, having the tube H attached to it, the pan B being arranged, as shown, to admit of a quicksilver-receptacle, $b$, into which the rim $a'$ of the pan F projects, substantially as and for the purpose herein set forth.

JOHN G. RANDALL.

Witnesses:
D. P. WILSON,
ANSON RUDD.